US008028732B1

(12) United States Patent
Ingram et al.

(10) Patent No.: US 8,028,732 B1
(45) Date of Patent: *Oct. 4, 2011

(54) TIRE INFLATION SYSTEM

(75) Inventors: Anthony L. Ingram, Guthrie, OK (US);
Calvin Burgess, Guthrie, OK (US);
Michael H. Penwell, Oklahoma City, OK (US); Patrick E. Roberts, Owasso, OK (US)

(73) Assignee: Airgo IP, LLC, Guthrie, OK (US)

( * ) Notice: Subject to any disclaimer, the term of this patent is extended or adjusted under 35 U.S.C. 154(b) by 216 days.

This patent is subject to a terminal disclaimer.

(21) Appl. No.: 12/146,287

(22) Filed: Jun. 25, 2008

Related U.S. Application Data

(63) Continuation-in-part of application No. 11/761,310, filed on Jun. 11, 2007, now Pat. No. 7,418,989, which is a continuation of application No. 11/220,425, filed on Sep. 7, 2005, now Pat. No. 7,302,980, which is a continuation of application No. 10/851,441, filed on May 21, 2004, now Pat. No. 6,968,882, which is a continuation of application No. 09/993,019, filed on Nov. 13, 2001, now abandoned, which is a continuation of application No. 09/522,623, filed on Mar. 10, 2000, now Pat. No. 6,585,019, which is a continuation of application No. 09/079,571, filed on May 14, 1998, now Pat. No. 6,105,645.

(51) Int. Cl.
*B60B 23/10* (2006.01)
(52) U.S. Cl. .................................... 152/417; 152/415
(58) Field of Classification Search .................. 152/415, 152/416, 417, 418
See application file for complete search history.

(56) References Cited

U.S. PATENT DOCUMENTS

| 1,016,896 | A | * | 2/1912 | Rivers | 152/417 |
| 1,072,907 | A | | 9/1913 | Brooks | |
| 1,083,847 | A | * | 1/1914 | McDowell et al. | 152/417 |
| 1,165,057 | A | | 12/1915 | Bayly | |
| 1,827,662 | A | * | 10/1931 | Maas | 152/416 |
| 2,090,089 | A | * | 8/1937 | Wiegand | 152/417 |
| 2,156,841 | A | * | 5/1939 | Davis | 152/417 |
| 2,177,042 | A | * | 10/1939 | Michael | 301/38.1 |
| 2,242,207 | A | * | 5/1941 | Bowers | 152/415 |
| 2,657,731 | A | | 11/1953 | Gozzoli | |
| 2,849,047 | A | | 8/1958 | Lamont et al. | |
| 2,976,606 | A | | 3/1961 | Huet | |
| 3,276,503 | A | | 10/1966 | Kilmarx | |
| 3,367,722 | A | | 2/1968 | Miyanaga | |
| 3,705,614 | A | | 12/1972 | Juttner et al. | |
| 3,838,717 | A | | 10/1974 | Wolf | |
| 4,387,931 | A | | 6/1983 | Bland | |

(Continued)

*Primary Examiner* — Russell D Stormer
(74) *Attorney, Agent, or Firm* — Fellers, Snider, et al.; Daniel P. Dooley

(57) ABSTRACT

Preferably, an embodiment of a tire inflation system includes at least an axle housing a pressurized fluid, a hubcap supported by the axle and having an interior and an exterior, and a rotary union axially aligned with the axle and mounted to the hubcap from the exterior of the hubcap. The rotary union preferably includes at least a rotating portion and a non-rotating portion, the rotating portion rotates with hub cap, and the non-rotating portion including at least a fluid conduit defining an air passage there through. The air conduit is preferably in fluid communication with the source of pressurized air, and is preferably configured for conducting pressurized air from said source of pressurized air to a tire mounted to the wheel of the vehicle, and for developing a dynamic seal between the fluid conduit and the rotating portion.

21 Claims, 12 Drawing Sheets

U.S. PATENT DOCUMENTS

| | | |
|---|---|---|
| 4,582,107 A | 4/1986 | Scully |
| 4,641,698 A | 2/1987 | Bitonti |
| 4,685,501 A * | 8/1987 | Williams .................... 152/417 |
| 4,805,681 A | 2/1989 | Vollmer et al. |
| 4,844,138 A | 7/1989 | Kokubu |
| 4,883,106 A | 11/1989 | Schultz et al. |
| 4,924,926 A | 5/1990 | Schultz et al. |
| 5,080,156 A | 1/1992 | Bartos |
| 5,080,157 A | 1/1992 | Oerter |
| 5,174,839 A | 12/1992 | Schultz et al. |
| 5,236,028 A | 8/1993 | Goodell et al. |
| 5,287,906 A | 2/1994 | Stech |
| 5,377,736 A | 1/1995 | Stech |
| 5,398,743 A | 3/1995 | Bartos |
| 5,429,167 A | 7/1995 | Jensen |
| 5,482,358 A | 1/1996 | Kuck |
| 5,538,062 A | 7/1996 | Stech |
| 5,558,408 A | 9/1996 | Naedler et al. |
| 5,584,949 A | 12/1996 | Ingram |
| 5,752,746 A | 5/1998 | Perry |
| 5,767,398 A | 6/1998 | Naedler |
| 5,769,979 A | 6/1998 | Naedler |
| 6,105,645 A | 8/2000 | Ingram |
| 6,145,559 A | 11/2000 | Ingram, II |
| 6,585,019 B1 | 7/2003 | Ingram |
| 6,968,882 B2 | 11/2005 | Ingram |
| 7,302,980 B2 | 12/2007 | Ingram |
| 2005/0133134 A1 | 6/2005 | Ingram et al. |

* cited by examiner

TIRE INFLATION SYSTEM

RELATED APPLICATIONS

This application is a continuation-in-part of U.S. patent application Ser. No. 11/761,310 filed Jun. 11, 2007, which is a continuation of U.S. Pat. No. 7,302,980 issued Dec. 4, 2007 on an application Ser. No. 11/220,425 filed Sep. 7, 2005, which is a continuation of U.S. Pat. No. 6,968,882 issued Nov. 29. 2005 on an application Ser. No. 10/851,441 filed May 21, 2004, which is a continuation of Ser. No. 09/993,019 filed Nov. 13, 2001 (now abandoned), which is a continuation application of U.S. Pat. No. 6,585,019 issued Jul. 1, 2003 on an application Ser. No. 09/522,623 filed Mar. 10, 2000, which is a continuation of U.S. Pat. No. 6,105,645 issued Aug. 22, 2000 on an application Ser. No. 09/079,571 filed May 14, 1998.

FIELD OF THE INVENTION

The present invention relates to the field of tire inflation. More particularly, the present invention relates to the inflation tires supporting tractor trailers, even while the trailers are traveling along a roadway.

BACKGROUND OF THE INVENTION

The present invention relates to an improved rotary union for use in a central tire inflation system for automatically maintaining the inflation pressure of the pneumatic tires on moving vehicles such as tractor trailers. Central tire inflation systems employed on typical tractor trailers utilize the air compressor on the tractor as a source of pressurized air to fill a leaking tire while the trailer is in motion. The compressor directs air to the reserve air brake tank on the trailer, which generally corresponds to the range of typical inflation pressures in the tires used on trailers. Air from the reserve air brake tank is first directed to the braking system to maintain the air pressure in the braking system. Excess air is directed from the tank through a pressure protection valve to a control box for the tire inflation system. The pressure protection valve only opens to direct the air to the control box when excess air pressure is present, thereby preventing air from being directed to the air inflation system which is needed for the trailer braking system.

The control box contains a pressure regulator which is set to the cold tire pressure of the particular tires on the trailer so as to supply air to the tires at the desired pressure level in the event of a leak. Air is directed from the control box to the leaking tire through one of the trailer axles, which either carries an air line from the control box, or is sealed and functions as an air conduit. The pressurized air carried by the axles communicates with each pair of trailer tires mounted thereon through a rotary union assembly by which air flow is directed from a stationary air line to the valve stems on the rotating tires. Pressure responsive valves are employed between each rotary union assembly and its associated tires so that upon the occurrence of a leak in one of the tires, the resulting pressure loss will cause one of the valves to open and allow air flow from the rotary union assembly to pass therethrough to the leaking tire.

As tire inflation systems become adopted for broader uses, reliability and ease of maintenance have emerged as important demands from the industry, accordingly improvements in apparatus and methods of installing tire inflation systems are needed and it is to these needs the present invention is directed.

SUMMARY OF THE INVENTION

In accordance with preferred embodiments, a tire inflation system is provided with an axle housing a pressurized fluid, a hubcap supported by the axle and having an interior and an exterior, and a rotary union axially aligned with the axle and mounted to the hubcap from the exterior of the hubcap.

The rotary union preferably includes at least a rotating portion and a non-rotating portion, the rotating portion rotates with the hub cap, and the non-rotating portion including at least a fluid conduit defining an air passage there through. The fluid conduit is preferably in fluid communication with the source of pressurized air, and configured for conducting pressurized air from said source of pressurized air to a tire mounted to the wheel of the vehicle.

In an alternate preferred embodiment, a tire inflation system incorporates at least an axle housing a pressurized fluid, a hubcap supported by the axle and having an interior and an exterior, a rotary union housing supported by the hubcap, the rotary union housing mounted to the hubcap from the exterior of the hubcap, and a rotary union confined by the rotary union housing securing the rotary union a predetermined distance from the axle. Preferably, the rotary union includes at least a rotating portion for rotation with the hubcap and a fluid conduit extending from the axle to the rotating portion, the fluid conduit conducting pressurized fluid housed by the axle to the rotating portion, and a dynamic seal formed between the fluid conduit and the rotating portion.

These and various other features and advantages that characterize the claimed invention will be apparent upon reading the following detailed description and upon review of the associated drawings.

BRIEF DESCRIPTION OF THE DRAWINGS

The present invention is illustrated by way of example and not limitation in the figures of the accompanying drawings, in which like references indicate similar elements and in which.

DESCRIPTION OF PREFERRED EMBODIMENTS

Figure 1:
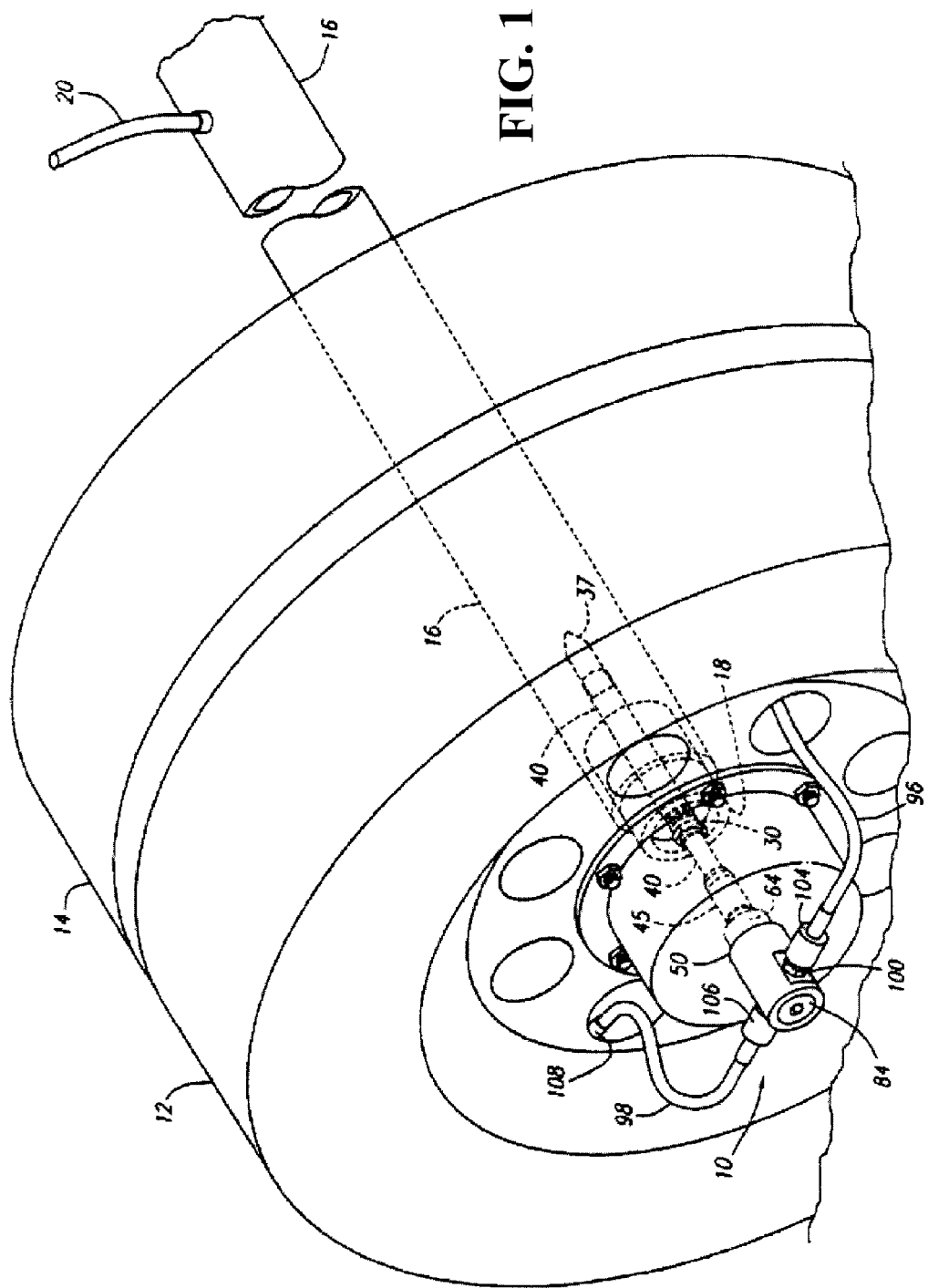
FIG. 1 is a partial perspective view of a rotary union assembly of the present novel tire inflation system shown secured to an outer wheel of a pair of tractor trailer tires mounted on a stationary axle.

It will be readily understood that elements of the present invention, as generally described and illustrated in the Figures herein, could be arranged and designed in a wide variety of different configurations. Referring now in detail to the drawings of the preferred embodiments, the rotary union assembly 10 (also referred to herein as assembly 10) of the first preferred embodiment, while useable on a wide variety of movable vehicles employing stationary axles for automatically maintaining the inflation pressure of the pneumatic tires thereon, is particularly adapted for use on tractor trailers. Accordingly, the assembly 10 of the first preferred embodiment will be described in conjunction with a pair of adjacent vehicle tires 12 and 14 mounted on a stationary tractor trailer axle 16 (also referred to herein as trailer axle 16, and axle 16). While identical rotary union assemblies 10 are provided at the end of each axle on the trailer to maintain the inflation pressure of the tires carried thereby, in each: the preferred embodiment; the alternate preferred embodiment; and the alternative preferred embodiment, reference will be made to only one such assembly and the pair of tires it services.

Figure 2:
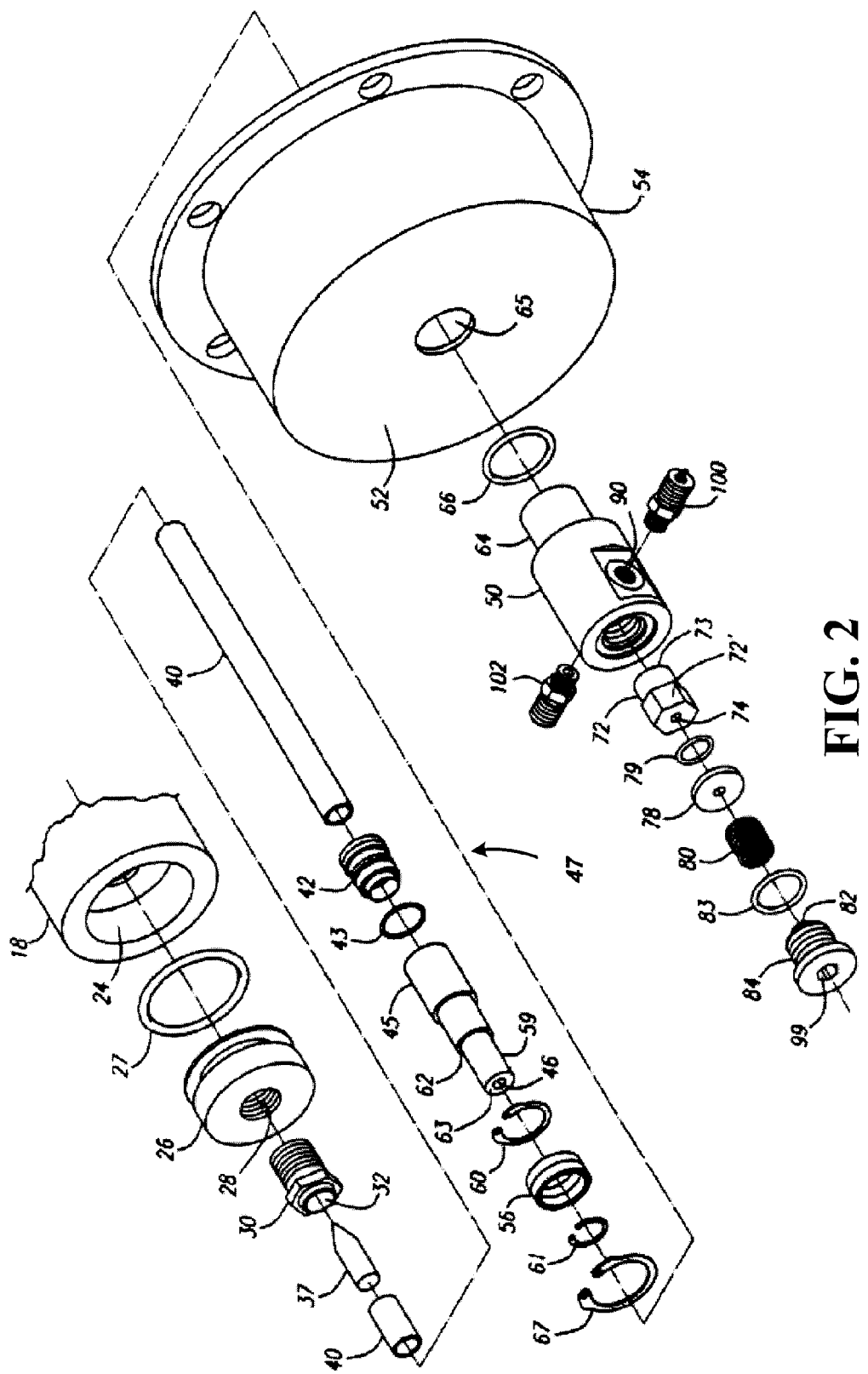
FIG. 2 is an exploded perspective view of the components of the rotary union assembly of the present novel tire inflation system.
Figure 3:
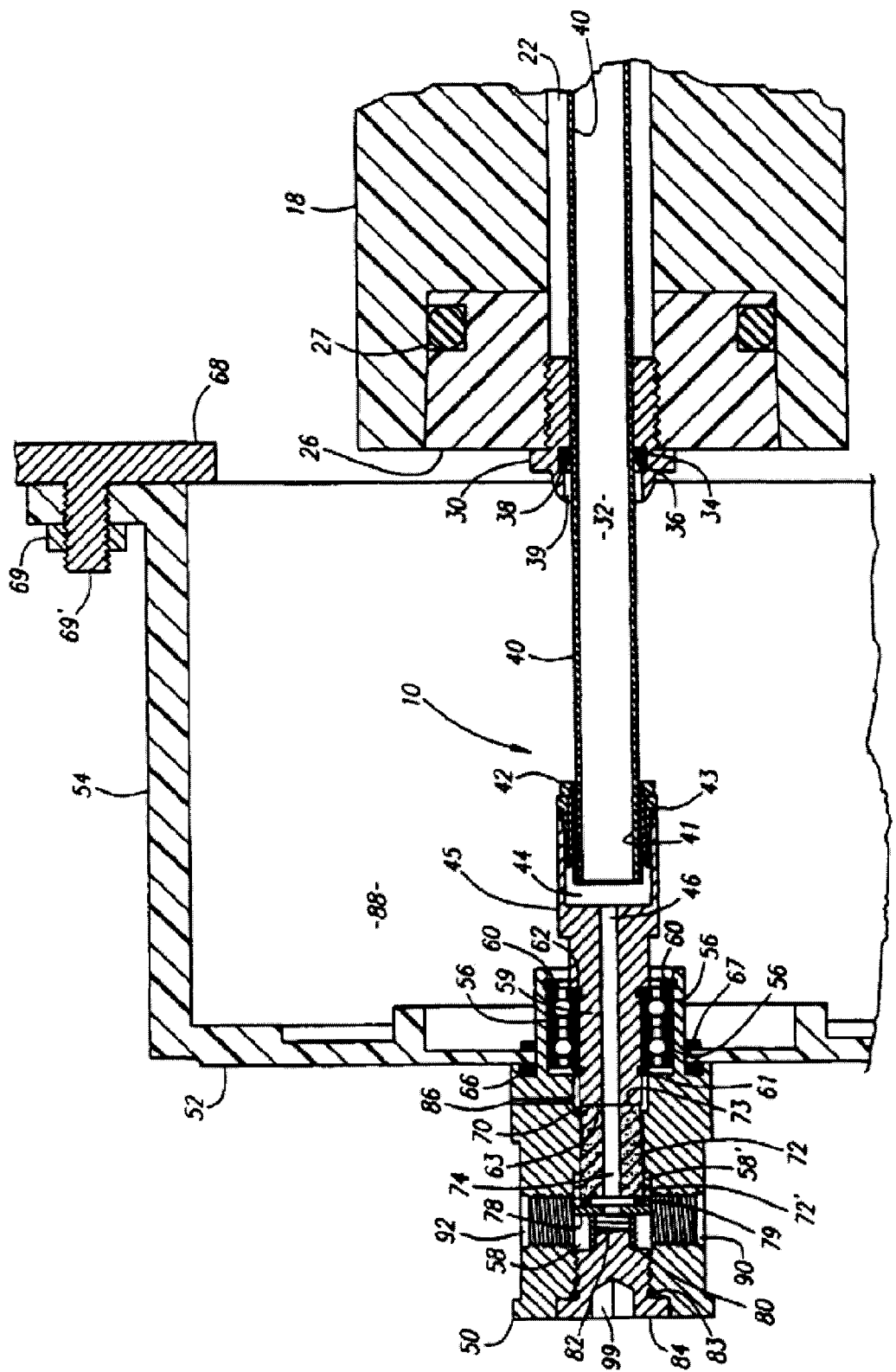
FIG. 3 is a sectional side view of the rotary union assembly of the present novel tire inflation system and associated axle spindle.

Preferably, the trailer axle 16 which carries tires 12 and 14 is sealed and functions as a source for pressurized fluid, to communicate the spindles 18 welded to the extended ends of a trailer axle 16 with a fluid supply line 20. The fluid supply line 20 preferably provides air under pressure to the interior of axle 16 from the conventional air compressor on the tractor via a standard pressure protection valve and control box (not shown) to pressurize the axle at the cold tire pressure of the trailer tires. As seen in FIGS. 2 and 3, the axle spindle 18 has a centrally disposed conduit 22 extending axially therethrough which terminates at its downstream end in an enlarged cylindrical bore 24. A cylindrical plug 26 provided with an o-ring 27 mounted in a groove in its outer surface is sealably secured in the cylindrical bore 24. The cylindrical plug 26 defines a centrally disposed axial threaded opening 28 therein, and can be secured in the cylindrical bore 24 in a press fit or by means of self-tapping-threads. A through flow fitting 30 (also referred to herein as fitting 30) is threadably engaged in the threaded opening 28 with the threads thereon being of the NPT type and preferably coated with a suitable sealant so as to form an airtight fitment with the cylindrical plug 26. In an alternate embodiment of trailer axles which define solid ends, the extended ends are drilled and tapped to provide the threaded opening 28 for the fitting 30.

The fitting 30 preferable defines an open axial channel 32 (also referred to herein as channel 32) extending therethrough and carries an o-ring 34 therein extending about channel 32 adjacent a seal retaining ring 36. The o-ring 34 and the seal retaining ring 36 are disposed in an offset portion 38 of channel 32 which terminates in a downstream, slightly enlarged channel portion 39 as seen in FIG. 3. A flexible air hose 40 (also referred to herein as hose 40) is disposed in channel 32 and projects therethrough into conduit 22 of the spindle 18 so as to communicate with the interior of pressurized axle 16. A suitable fluid filter 37 is provided in an upstream end portion of hose 40 within axle 16 to remove any debris from the air flow through hose 40 which might exist within the axle interior.

The o-ring 34 carried in fitting 30 forms an airtight seal about hose 40 while allowing for the hose to be axially adjusted with respect to fitting 30. The downstream end portion 41 of hose 40 is secured within a second fitting 42 which securely grips hose 40. A fitting marketed by Parker Hannifin Corporation under the name Presto Encapsulated Cartridge Model PPMCEN-4, tube size ¼, is ideally suited for the second fitting 42 for use with hose 40 having a 0.250 in. outside diameter. Flexible hose 40 is preferably constructed of a nylon or plastic material and defines a wall thickness of about 0.050 in.

The second fitting 42 carries an external o-ring 43 and is sealably secured in a press fitment within a chamber 44 formed in the upstream end of an elongated steel stationary shaft 45 (also referred to herein as shaft 45) axially aligned with hose 40. The shaft 45 has an axially disposed fluid channel 46 extending therethrough communicating with chamber 44. In the first preferred embodiment of the tire inflation system, the hose 40, the second fitting 42, the o-ring 43, and the shaft 45 collectively form a fluid conduit 47. Shaft 45, of fluid conduit 47, projects into a rotary union housing 50 (also referred to herein as housing 50), which is mounted exteriorly adjacent an exterior surface 52 of a hubcap 54.

The rotary union housing 50 defines a channel 58 extending axially therethrough for receiving shaft 45 and the other components of the rotary union 70. A pair of high quality self-lubricating bearings 56 are mounted within housing 50 about a portion of channel 58 which receive in a press fitment a downstream portion 59 of the shaft 45 so as to provide a freely rotational mounting of the rotary union housing 50 on shaft 45. Bearings marketed by NTN Bearing Corporation of America of Mt. Prospect, Ill. under the model designation W688AZZ/1K have been found to be well suited for this application. The bearings 56 are secured in place within housing 50 by retaining rings 60 and 61. The downstream portion 59 of shaft 45, which projects through bearings 56, is of a reduced diameter to define a bearings abutment shoulder 62 and a flat end face 63.

A reduced diameter portion 64 of the housing 50 projects through a centrally disposed aperture 65 in the end wall of 54 such that the housing 50 can be sealably secured against the exterior surface 52 of the hubcap 54 in axial alignment with the shaft 45, the hose 40 and the fitting 30 by means of an exterior o-ring 66 and interior locking ring 67. The hubcap 54 is secured to a wheel hub 68 by means of the threaded engagement of the wheel lug nuts 69 with lug bolts 69'. Preferably, the wheel hub 68 is secured to the spindle 18 via the use of wheel bearings (not shown separately). Accordingly, rotation of tires 12 and 14 will effect rotation of the hubcap 54 and the housing 50 with respect to the shaft 45, the hose 40 and the fitting 30.

The rotary union or seal 70 in the housing 50 is defined by the shaft 45, an axially aligned graphite element 72 having an open ended channel 74 extending axially therethrough, a steel washer 78, an o-ring 79 disposed between the washer 78 and the downstream end of the graphite element 72, and a coil spring 80 carried by a cylindrical projection 82 on a plug 84. The plug 84 is provided with an o-ring 83 thereon and is threadably secured in a sealing engagement in the extended end of the rotary union housing 50.

The graphite element 72 defines a hexagonal portion 72' which fits within a correspondingly configured portion 58' of the flow through channel 58 of the housing 50 such that rotational movement of the housing 50 with the hubcap 54 is imparted to graphite element 72. The coil spring 80, when compressed to 0.25 inches, produces spring force of less than 10 pounds and bears against the 84 and washer 78 so as to urge the upstream planar end face 73 of graphite element 72 against the flush downstream adjacent planar end face 63 of the shaft 45.

A weep hole 86 is provided in the rotary union housing 50 which communicates with channel 58 therein proximate the abutment of the rotating end face 73 on the graphite element 72 with the end face 63 of shaft 45. Thus, in the event any air leakage were to occur at the rotary union 70, the air would pass to the atmosphere and not pressurize the bearings or leak past the bearings to the lubrication compartment 88 within the. In addition, a plurality of conventional duck bill type relief valves (not shown) would preferably be provided in the exterior surface 52, radially spaced from rotary union housing 50, so that in the unlikely event an air leak were to occur, a pressure build up in the lubrication compartment would be avoided.

Figure 4:
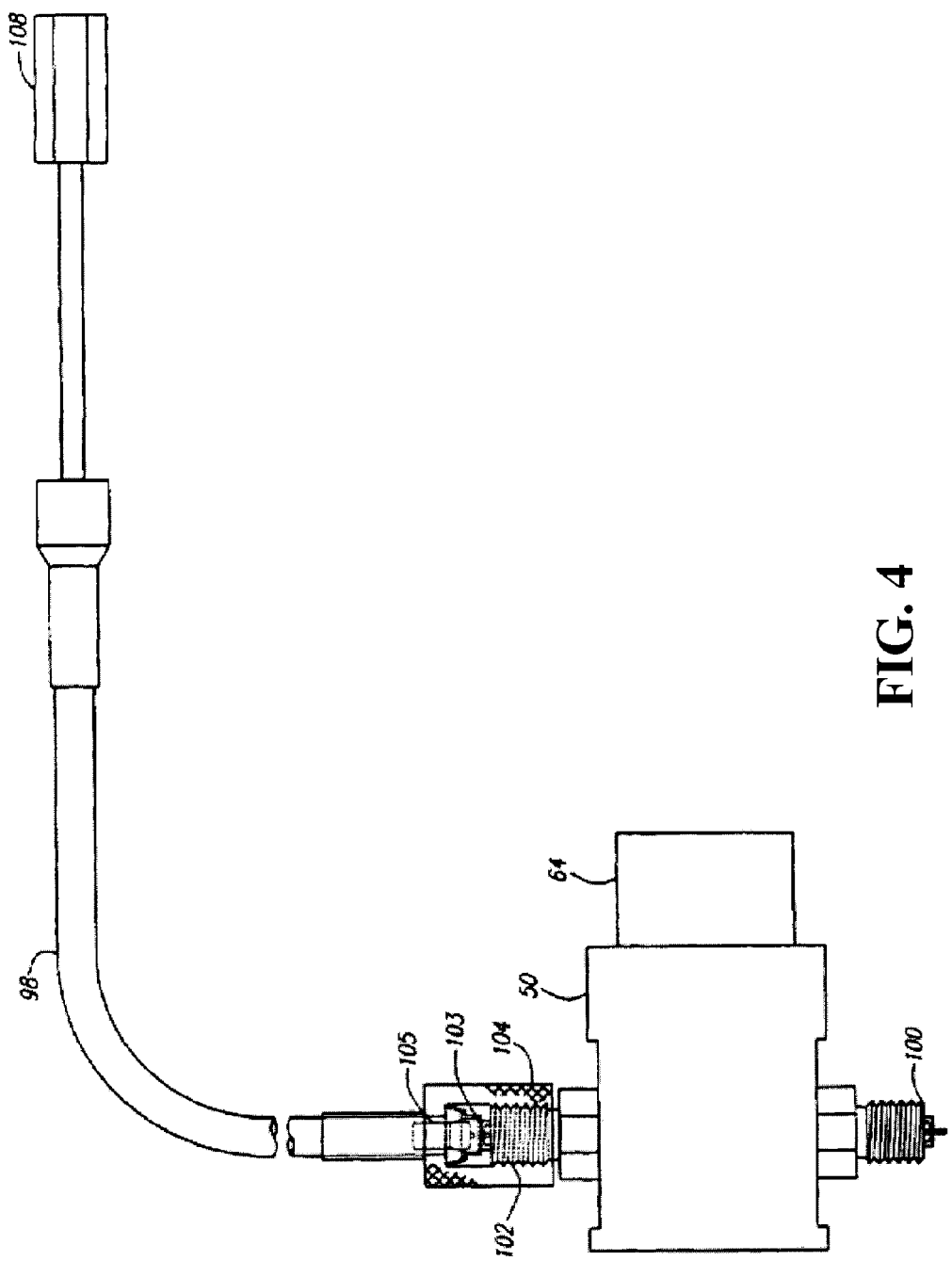
FIG. 4 is a partial side view of the rotary union housing, air lines and associated valves preferably employed by the present novel tire inflation system.

A pair of oppositely aligned radial channels 90 and 92 is provided in the rotary union housing 50 which communicate with the axial channel 58 therein proximate the coil spring 80 as seen in FIG. 3. Through the aforesaid configuration, air under pressure in axle 16 passes into and through the hose 40, fittings 30 and 42 and the shaft 45 into the rotating graphite element 72 being urged against the shaft 45 by the coil spring 80. The air then passes through element 72 and into channels 90 and 92 of the housing 50 for direction to the trailer tires 12 and 14 via air lines 96 and 98 (see FIG. 4). The resulting rotary seal has been found to exhibit an extremely long life without leakage. By means of the threadably engaged plug 84, which defines an Allen wrench opening 99 in the head portion thereof, ready access is provided to the interior of the rotary union housing 50 and the elements comprising the rotary seal 70 disposed therein.

The opposed channels 90 and 92 in the housing 50 are provided with internal threads for the threaded engagement therein of preferred Schraeder valves 100 and 102 respectively. (See FIG. 4). Valves 100 and 102 each have an opening pressure of about 90 psi and are held open by a conventional check valve depressor 103 (only one being shown) mounted in the air lines 96 and 98 within knurled nut ends 104 and 106 carried thereby. Mounted downstream and substantially adjacent depressors 103 are preferably a second pair of Schraeder valves 105 (only one being shown) which are normally closed and have an opening pressure of about 3 psi. Air lines 96 and 98 project in opposed directions from rotary union housing 50 to the conventional valve stems (not shown) carried on tires 12 and 14. The threaded hose fittings 108 carried by downstream ends of air lines 96 and 98 for threaded engagement with the tire valve stems are each provided with a check valve depressor (not shown) such that upon threadably securing the air hoses to the valve stems, the check valves in the tire valve stems are maintained in an open disposition, thereby communicating the interior of tires 12 and 14 with air lines 96 and 98.

Through the aforesaid configuration, air under a pressure corresponding to that of the cold pressure of the vehicle tires 12 and 14 is provided from axle 16 through the rotary union assembly 10 and the open Schraeder valves 100 and 102 carried by the housing 50. Because the air passing through valves 100 and 102 to valves 105 is at the same pressure as the air within tires 12 and 14, valves 105 are balanced and remain closed, preventing air flow through the rotary union assembly 10. In the event of a leak in one of the tires, the resulting pressure drop downstream in air, hose 96 or 98 will create a pressure imbalance across the valve 105 mounted therein. As soon as this imbalance reaches 3 psi, the valve 105 will open, allowing air to pass therethrough to the leaking tire to maintain the desired inflation pressure within the tire. When the automatic air inflation system is shut down, the pressure within the axle remains at the tire inflation pressure. Accordingly, valves 105 remain balanced and closed so that the tires will not deflate. If the axle were to leak so that the pressure were to drop on the upstream side of valves 105, they would remain closed so that the tires would not release air to the depressurized chamber within the axle. If one were to remove one of hoses 96 or 98 from housing 50, as would occur if the hoses were damaged, valve 100 or 102 would close so that the system would not continually blow air to the atmosphere.

Preferably, a warning light (not shown) is provided so as to alert the driver in the event of the activation of the automatic tire inflation system, which would be indicative of a tire leak. Additionally, if one were to disconnect one of air lines 96 or 98 from its respective tire stem, the warning light would also illuminate so that the automatic tire inflation system would not continuously pump air through the system without the knowledge of the driver. Such a warning system could comprise a microswitch in electrical communication with the wiring harness on the trailer which closes upon the activation of the control box in the automatic tire inflation system and triggers a transmitter which would send a signal to a receiving unit mounted on the front left corner of the trailer. The receiving unit would activate a plurality of LED's which would be clearly visible to the driver through the side mirror of the attached tractor.

Figure 5:
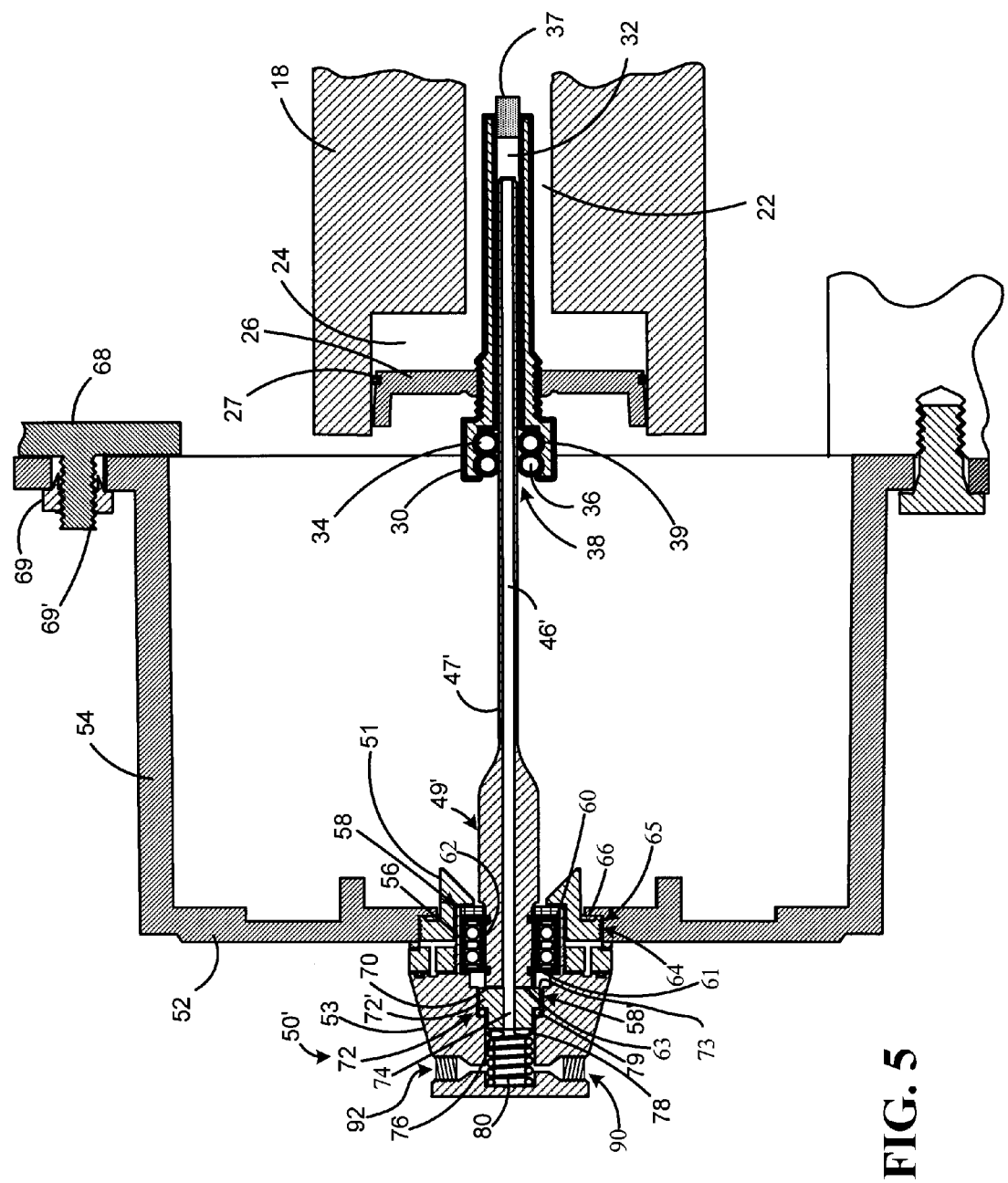
FIG. 5 is a cross-sectional side view of an alternate rotary union assembly of the present novel tire inflation system and an associated axle spindle.

Turning to FIG. 5, as shown therein, fitting 30 of an alternate preferred embodiment defines an open axial channel 32 (also referred to herein as channel 32) extending therethrough and carries an o-ring 34 therein extending about channel 32 adjacent a seal retaining ring 36, which optionally may also be formed from an o-ring. The o-ring 34 and the seal retaining ring 36 are disposed in an offset portion 38 of the channel 32 which terminates in a downstream, slightly enlarged channel portion 39 as seen in FIG. 5. The fitting 30 further provides support for the fluid filter 37. A fluid conduit 47', which in this alternate preferred embodiment is formed from a single member, is disposed in the channel 32 and projects therethrough into fluid communication with the conduit 22 in spindle 18 so as to communicate with the interior of the pressurized axle 16. The fluid filter 37 is provided adjacent an upstream end portion of the fluid conduit 47', and is configured to remove any debris from the pressurized fluid prior to the pressurized fluid passing through a fluid channel 46' of the fluid conduit 47'.

The o-ring 34 carried in the fitting 30 forms an airtight seal about the fluid conduit 47' while allowing for the conduit to be axially adjusted with respect to the fitting 30. A downstream end portion 49' of the fluid conduit 47', which in this alternate preferred embodiment is preferably formed from an elongated steel shaft, is axially aligned with axis of the spindle 18, and projects into a rotary union housing 50'. The rotary union housing 50' is preferably mounted exteriorly adjacent the exterior surface 52 of the hubcap 54, and is formed by the securement of a dynamic and static seal housing 53 to a lubrication trap 51.

Preferably, the rotary union housing 50' defines a channel 58 extending axially therethrough for receiving the downstream end portion 49' of the fluid conduit 47' and the other components of the rotary union 70. A pair of high quality self-lubricating bearings 56, are mounted within the rotary union housing 50' about a portion of channel 58, and in a press fitment with the downstream end portion 49' of the fluid conduit 47' so as to provide a freely rotational mounting of the rotary union housing 50' on the fluid conduit 47'. The bearings 56 are secured in place within housing 50' by retaining rings 60 and 61. The downstream end portion 49' of fluid conduit 47', which projects through bearings 56 is of a reduced diameter to define a bearings abutment shoulder 62 and a flat end face 63.

A reduced diameter portion 64 of the rotary union housing 50' projects through a centrally disposed aperture 65 in the exterior surface 52 of the hubcap 54 such that the rotary union housing 50' can be sealably secured against exterior surface 52 of the hubcap 54 in axial alignment with the fluid conduit 47' and fitting 30 by means of an exterior o-ring 66. Preferably, the hubcap 54 is secured to the outer tire wheel hub 68 by means of the threaded engagement of the wheel lug nuts 69, which includes a self centering feature, with lug bolts 69'. Preferably, when self centering nut 69 interacts with hubcap 54, the axis of rotation of hubcap 54 becomes aligned with the axis of rotation of the hub 68 thereby mitigating misalignment between the hubcap 54 and the hub 68. As a skilled artisan will appreciate the, wheel hubs such as 68 are also configured with threaded holes, rather than with lug bolts 69', and bolts are used to secure the hubcap 54 to the hub 68. For those configurations, it is preferred that self centering bolts, rather than self centering nuts are used to align the hubcap 54 with the hub 68. Accordingly, rotation of tires 12 and 14 will effect rotation of the hubcap 54 and the rotary union housing 50' with respect to the axially aligned and stationary fluid conduit 47' and fitting 30.

The rotary union 70 in the rotary union housing 50' takes the form of a face seal defined and formed by the end face 63 of the fluid conduit 47', in pressing engagement with an axially aligned graphite element 72. The graphite element 72 preferably has an open ended channel 74 extending axially therethrough, and the rotary union assemble further includes at least a steel washer 78, an o-ring 79 disposed about the downstream end portion 76 of the graphite element 72, and a coil spring 80 carried by the dynamic and static seal housing 53.

The graphite element 72 defines a hexagonal portion 72' which fits within a correspondingly configured portion 58' of the flow through channel 58 in rotary union housing 50' such that rotational movement of rotary union housing 50' with the hubcap 54 is imparted to graphite element 72. Preferably, the coil spring 80, when compressed to 0.25 inches produces spring force of less than 10 pounds and bears against an internal surface of the dynamic and static seal housing 53 and washer 78 so as to urge the upstream planar end face 73 of the graphite element 72 flush against the downstream adjacent the planar end face 63 of the fluid conduit 47'.

In the present alternate preferred embodiment, a pair of oppositely aligned radial channels 90 and 92 is provided by the rotary union housing 50'. The aligned radial channels 90 and 92 communicate with the axial channel 58 therein proximate coil spring 80 as seen in FIG. 5. Through the aforesaid configuration, air under pressure in axle 16 passes into and through the fitting 30, the fluid conduit 47', into the rotating graphite element 72 being urged against the fluid conduit 47' by the coil spring 80. The air then passes through the graphite element 72 and into the aligned radial channels 90 and 92 for direction to the trailer tires 12 and 14 via air lines 96 and 98 (see FIG. 4). Preferably, the aligned radial channels 90 and 92 are configured to accept the valves 100 and 102 shown by FIG. 2.

Figure 6:
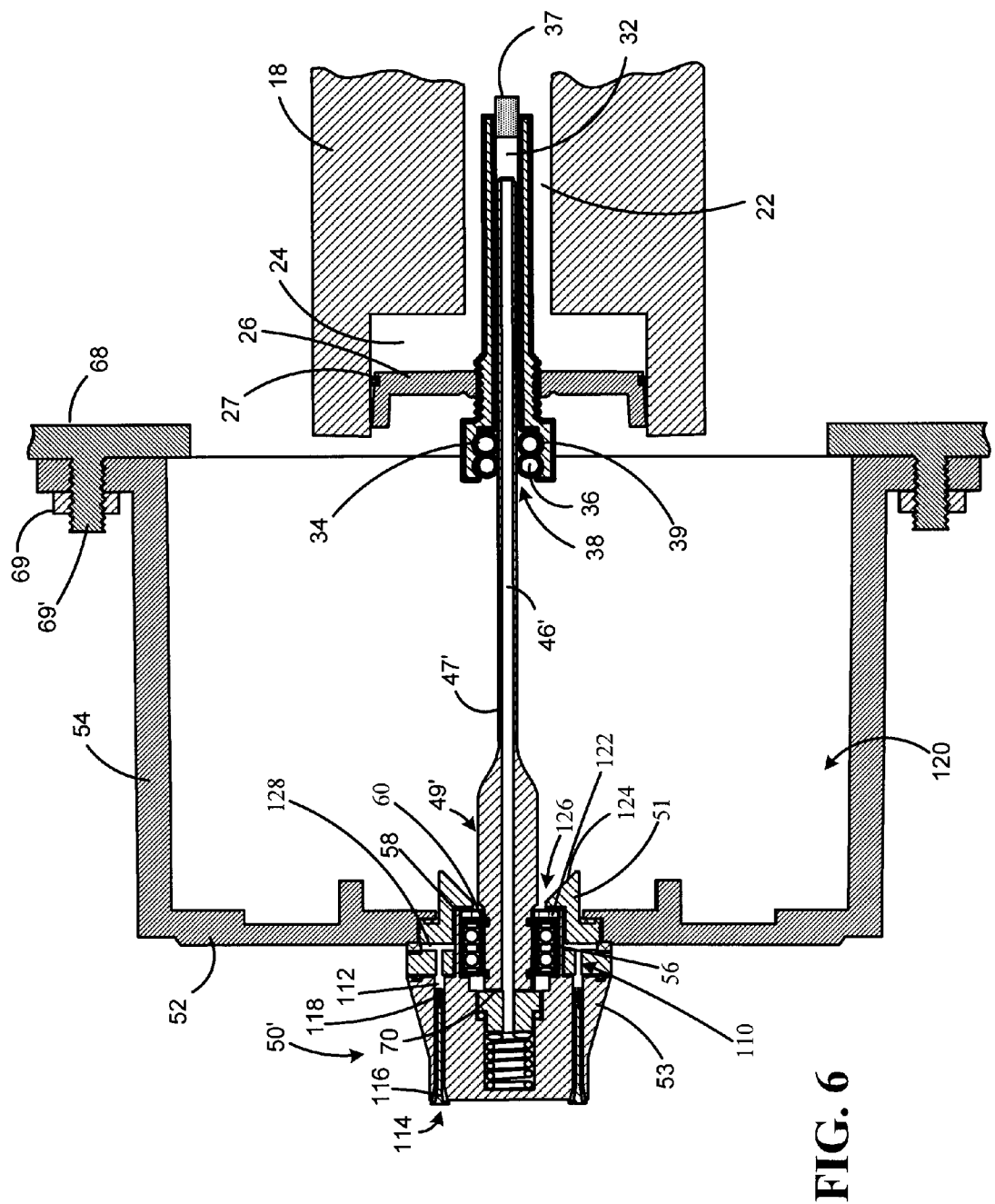
FIG. 6 is an alternative cross-sectional side view of the alternate rotary union assembly of FIG. 5.

FIG. 6 shows an alternative across-sectional view of the alternate rotary union assembly embodiment of FIG. 5. The view of that portion of the inventive tire inflation system shown by FIG. 5 is a view that is rotated 90° from the view shown by FIG. 5. Included in the illustration of FIG. 6 is a pressure relief pathway 110 provided in the lubrication trap 51 of the rotary union housing 50' which communicates with channel 58, such that in the event any fluid leakage were to occur at the rotary union 70, the fluid would pass to the atmosphere via a pressure relief channel 112 controlled by a pop-it valve 114. The pop-it valve 114 is formed from a valve stem 116 and a valve spring 118. When a predetermined sufficient pressure level is attained via a build up in pressure of the fluid behind the valve stem 116 to overcome a spring force of valve spring 118 pulling the valve stem 116 adjacent the dynamic and static seal housing 53, fluid leakage is passed to the atmosphere.

In the present alternate embodiment of the novel invention, the interior of the hubcap 54 contains a lubricant, in the form of petroleum oil, which is used to lubricate the wheel bearings associated with the wheel hub 68. In an occurrence of an event that resulted in the escapement of the pressurized fluid housed by the trailer axle 16 (of FIG. 1) into an interior 120 of the hubcap 54, the pressure relief pathway 110 is utilized to promote passage of the escaped pressurized fluid from the interior 120 of the hubcap 54 to the atmosphere.

In the preferred embodiment of the present invention, small droplets of the petroleum oil can become airborne during periods of use of the trailer. If an instance of an escapement of the pressurized fluid housed by the trailer axle 16 (of FIG. 1) were to occur, the small droplets could be transported to the atmosphere, thereby depleting the supply of petroleum oil available to the wheel bearings. To mitigate the migration of the lubricant from the interior of the hubcap 120 to the exterior surface 52 of the hubcap 54 while conducting pressurized fluid from interior of the hubcap 120 to the exterior surface 52 of the hubcap 54, the pressure relief pathway 110 further includes a splash shield 122 disposed between the retaining ring 60 and a lubricant return surface 124 of the lubricant trap 51.

Preferably, as inadvertent fluid pressure builds in the interior of the hubcap 54, the pressurized fluid passes through an inlet port 126 of the pressure relief pathway 110. The inlet port 126 is preferably formed when lubrication trap 51 is positioned adjacent the fluid conduit 47', and secured to the dynamic and static seal housing 53. Upon passing through the inlet port 126, the pressurized fluid encounters the splash shield 122 and the portion of the oil droplets deposit on to the splash shield 122. The pressurized fluid continues along the pressure relief pathway 110 by way of the channel 58, which in the present alternate rotary union assembly embodiment is formed by the dynamic and static seal housing 53. It will be noted that in the present alternate embodiment, the pressure relief pathway 110 provides an oil trap 128, which collects oil droplets as the pressurized fluid makes its way to the pressure relief channel 112 controlled by a pop-it valve 114.

Again, when a predetermined sufficient pressure level is attained via a build up in pressure of the fluid behind the valve stem 116 to overcome a spring force of the valve spring 118 pulling the valve stem 116 adjacent the dynamic and static seal housing 53, inadvertent fluid pressure build up is passed to the atmosphere. Accordingly, the lubrication trap includes at least a pressure relief pathway 110 adjacent the fluid conduit 4T, the pressure relief pathway 110 is configured to mitigate migration of a lubricant from the interior 120 of the hubcap 54 to the exterior surface 52 of the hubcap 54 while conducting pressurized fluid from interior 120 of the hubcap 54 to the exterior surface 52 when the pressurized fluid within the interior 120 of the hubcap 54 attains a predetermined pressure level.

Figure 7:
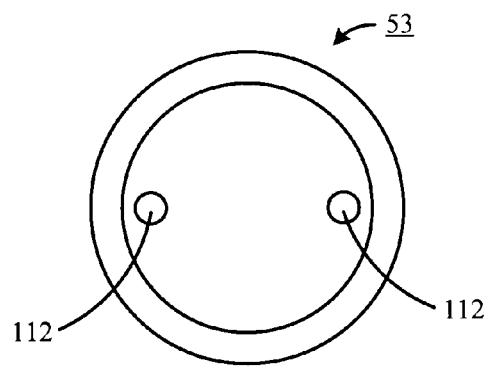
FIG. 7 is a top plan view of a rotary union housing of the alternate rotary union assembly of the present novel tire inflation system of FIG. 5.
Figure 8:
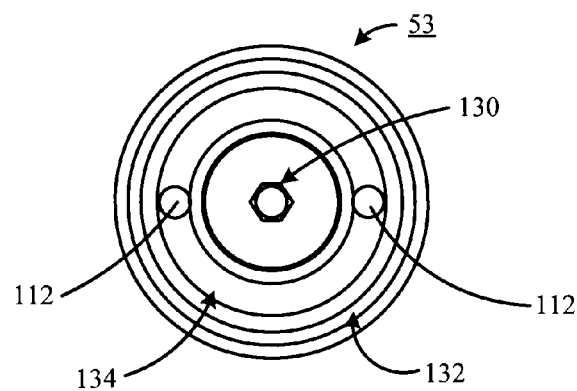
FIG. 8 is a bottom plan view of the rotary union housing of the alternate rotary union assembly of the present novel tire inflation system of FIG. 5.

FIG. 7 shows the dynamic and static seal housing 53 preferably provides a pair of pressure relief channels 112, while FIG. 8 shows the dynamic and static seal housing 53, which preferably provides a spring and graphite element reception cavity 130 configured to accept and support the coil spring 80, the washer 78, the graphite element 72, and the o-ring 79 (as shown by FIG. 5). FIG. 8 further shows the preferred dynamic and static seal housing 53 provides a gasket retention channel 132 and a pressurized air passage channel 134, which is in fluid communication with the pair of pressure relief channels 112.

Figure 9:
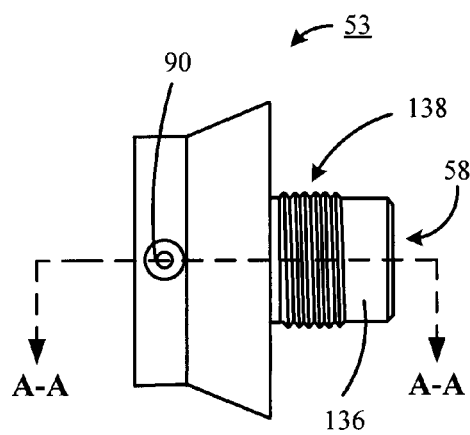
FIG. 9 is a side elevation view of the rotary union housing of the alternate rotary union assembly of the present novel tire inflation system of FIG. 5.
Figure 10:
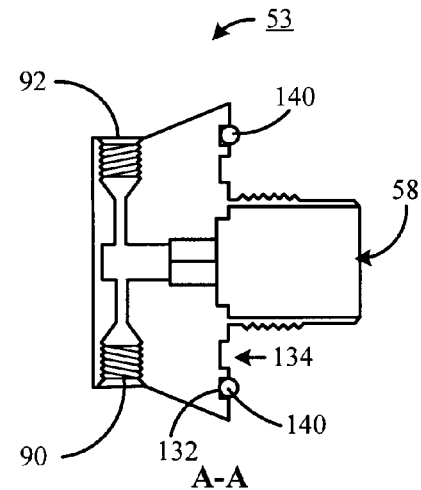
FIG. 10 is a cross-section side elevation view of the rotary union housing of the alternate rotary union assembly of the present novel tire inflation system of FIG. 5.

FIG. 9 shows the dynamic and static seal housing 53 preferably further provides a bearing confinement member 136, which encloses the channel 58 and supports lubricant trap attachment threads 138. FIG. 10 shows a gasket member 140 is positioned within the gasket retention channel 132, and serves to provide the seal between the lubrication trap 51 and the dynamic and static seal housing 53 when the lubrication trap 51 is secured tightly adjacent the dynamic and static seal housing 53. In the preferred embodiment, the gasket member 140 is an o-ring.

Figure 11:
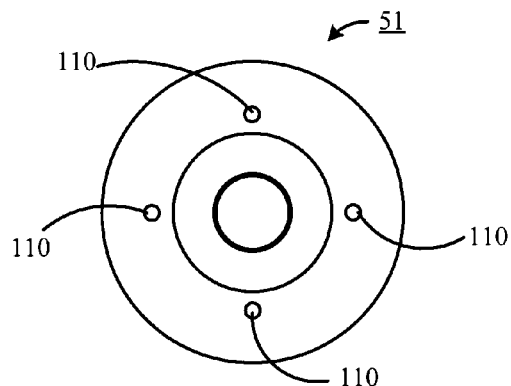
FIG. 11 is a top plan view of a lubricant trap of the alternate rotary union assembly of the present novel tire inflation system of FIG. 5.
Figure 12:
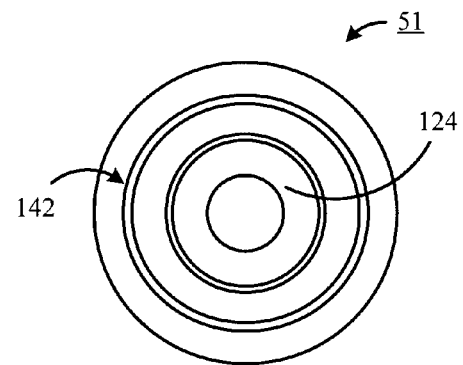
FIG. 12 is a bottom plan view of the lubricant trap of the alternate rotary union assembly of the present novel tire inflation system of FIG. 5.

FIG. 11 shows the lubrication trap 51 provides a plurality of pressure relief pathways 110, and FIG. 12 shows the lubrication trap 51 provides hubcap securement threads 142 and lubricant return surface 124, which is provided to constrain the petroleum oil within the hubcap 54 from interacting with the pair of bearings 56 (of FIG. 6), if the petroleum oil should inadvertently splash onto the lubrication trap 51.

Figure 13:
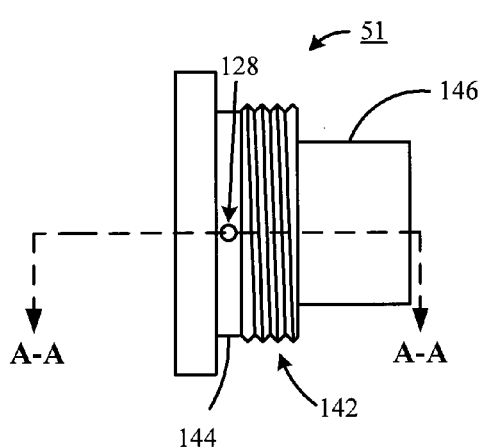
FIG. 13 is a side elevation view of the lubricant trap of the alternate rotary union assembly of the present novel tire inflation system of FIG. 5.
Figure 14:
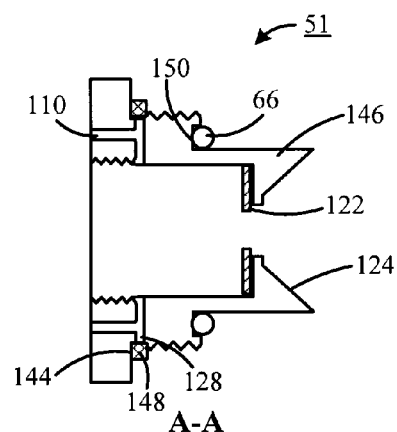
FIG. 14 is a cross-section side elevation view of the lubricant trap of the alternate rotary union assembly of the present novel tire inflation system of FIG. 5.

FIG. 13 shows the preferred lubrication trap 51 further provides a seal channel 144, which communicates with the oil trap 128 and a splash guard support portion 146 used to house the splash shield 122 (of FIG. 6), and FIG. 14 shows the seal channel 144 supports a pressure relief pathway seal 148, and that the exterior o-ring 66 is supported by o-ring channel 150.

Figure 15:
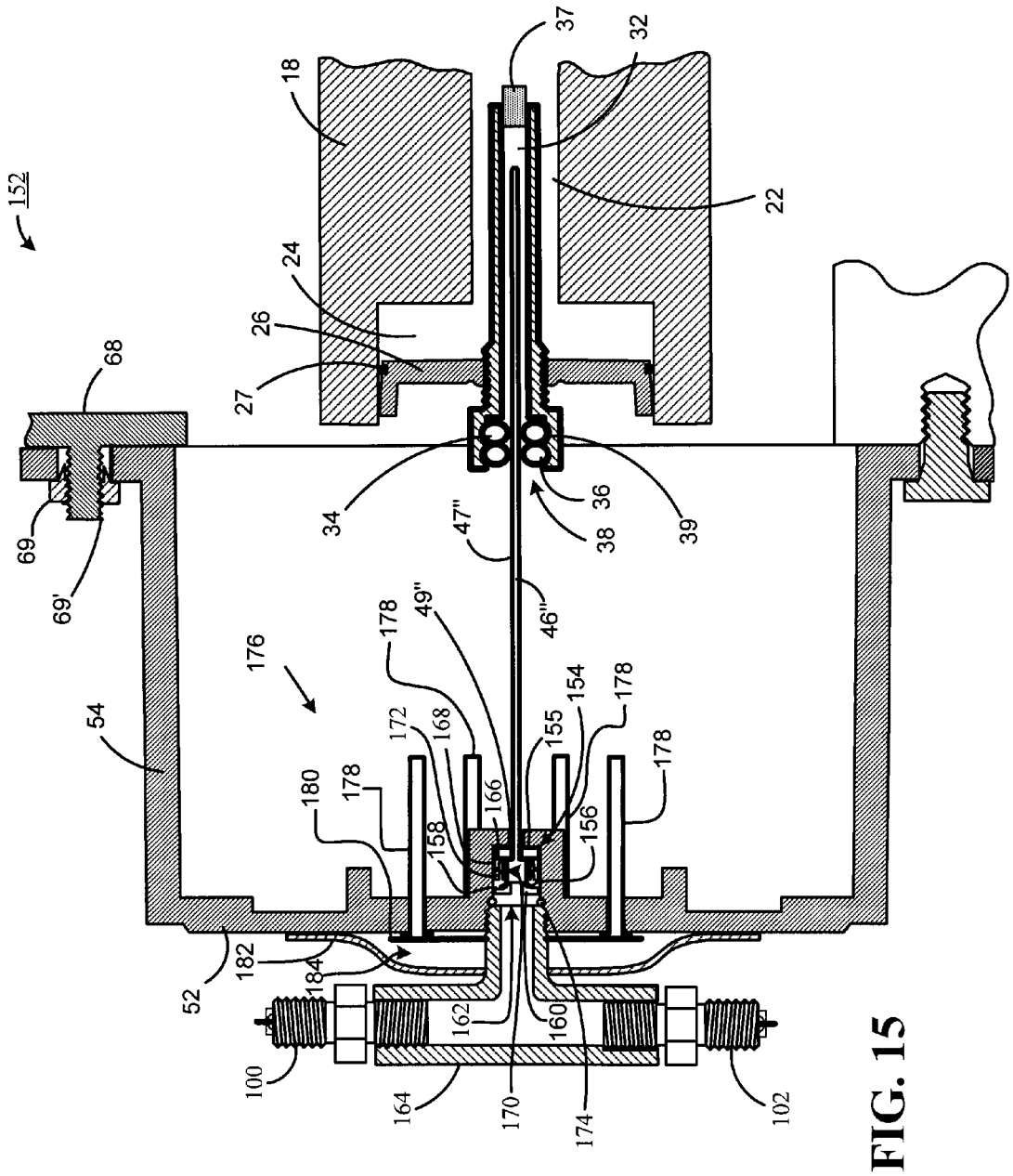
FIG. 15 is a cross-sectional side view of an alternative rotary union assembly of the present novel tire inflation system and an associated axle spindle.

FIG. 15 illustrates an alternative embodiment of a rotary union assembly 152 of the present inventive tire inflation system. The alternative embodiment 152 includes at least, fitting 30 that defines an open axial channel 32 (also referred to herein as channel 32) extending therethrough and carries an o-ring 34 therein extending about channel 32 adjacent a seal retaining ring 36, which optionally may also be formed from an o-ring. The o-ring 34 and retaining ring 36 are disposed in an offset portion 38 of channel 32 which terminates in a downstream, slightly enlarged channel portion 39 as seen in FIG. 15. The fitting 30 further provides support for the fluid filter 37. A fluid conduit 47", which in this alternative preferred embodiment is formed from a single member, is disposed in channel 32 and projects therethrough into fluid communication with the conduit 22 of the spindle 18 so as to communicate with the interior of pressurized axle 16 (of FIG. 1). The fluid filter 37 is provided adjacent an upstream end portion of fluid conduit 47", and is configured to remove any debris from the pressurized fluid prior to the pressurized fluid passing through a fluid channel 46" of the fluid conduit 47".

The o-ring 34 carried in the fitting 30 forms an airtight seal about fluid conduit 47" while allowing for the fluid conduit 47" to be axially adjusted with respect to the fitting 30. An expanded downstream end portion 49" of fluid conduit 47" (which in this alternative preferred embodiment is preferably hydro formed from an elongated brass or copper tubular member) is axially aligned with the axis of the spindle 18, and projects into a rotary union pocket 154 that is formed by depressing the exterior surface 52 of the hubcap 54.

Figure 17:
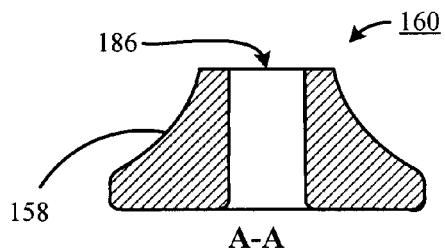
FIG. 17 is a cross-sectional side elevation view of the bearing of the alternative rotary union assembly of the present novel tire inflation system of FIG. 16.

During the process of hydro forming the expanded downstream end portion 49", a radius flange 156 on the open end of the expanded downstream end portion 49" is preferably formed in a configuration that conforms to a shaped surface 158 of a bearing 160 (see FIG. 17). In a preferred embodiment, a bushing 155 and the bearing 160 may be formed of any suitable material such as a molybelenum impregnated nylon material. However, the bushing 155 may alternatively be formed from a metallic sub-straight and coated with ARMOLOY®, thin dense chromium process for metals that was developed in the 1950's by the Armoloy Corporation of Dekalb, Ill. as an alternative to conventional metal plating.

Preferably, the shaped surface 158 of the bearing 160 coacts with the radius flange 156 limiting the longitudinal or axial movement of the fluid conduit 47" and preventing the radius flange 156 from engaging a distal end 162 of a through tee 164. The introduction of the shaped surface 158 of the bearing 160 preferably provides a smooth, self-lubricating and wear resistant surface, and maintains the fluid conduit 47" in axial alignment with the hubcap 54, even in the face of misalignment between the hubcap 54 and the spindle 18. It is to be noted that the bearing 160 is supported by the fluid conduit 47" and sized slightly smaller than the rotary union pocket 154, thus even if the hubcap 54 is out-of-round relative to the axle 16, the bearing 160 will maintain its position relative to the fluid conduit 47".

In this alternative preferred embodiment 152, the bushing 155 is disposed between the exterior surface 52 of a hubcap 54 and the restricted end of the expanded downstream end portion 49". The introduction of the bushing 155 preferably provides a smooth, self-lubricating and wear resistant surface between a bottom surface 166 of a lip seal 168 (see FIG. 20), and a bottom portion of the rotary union pocket 154. The lip seal 168 may be formed from any suitable material such as NITRILE. Further, in this alternative preferred embodiment, a dynamic seal 170 is formed by the lip seal 168 communicating with the fluid conduit 47" when an expansion channel 172 of the dynamic seal 170 is provided with pressurized fluid. Upon formation of the dynamic seal 170, the lip seal 168 accommodates rotation of the hubcap 54 about the fluid conduit 47". Additionally and preferably, the through tee 164 is configured to accommodate the valves 100 and 102 shown by FIG. 2, to interface with the air lines 96 and 98 (of FIG. 4), and a retention ring (preferably an o-ring) 174, affixed within the rotary union pocket 154 and disposed between the through tee 164 and the bearing 160. The retention ring 174 inhibits an inadvertent removal of the bearing 160 from the rotary union pocket 154.

In this alternative preferred embodiment 152, a lubrication trap 176 providing at least a pressure relief pathway 178 adjacent the fluid conduit 47" and projecting through the hubcap 54, a pliable flap 180, and a flexible shield 182. The pressure relief pathway 178 mitigates migration of a lubricant from the interior 120 of the hubcap 54 to the exterior 52 of the hubcap 54 while conducting pressurized fluid from interior 120 of the hubcap 54 to the exterior 52 of the hubcap 54 when the pressurized fluid within the interior 120 of the hubcap attains a predetermined pressure level by directing the pressurized fluid to the pliable flap 180. The pliable flap 180 releases the pressurized fluid into a release chamber 184 formed between the pliable flap 180 and the flexible shield 182. Preferably, the release of the pressurized fluid into the release chamber 184 drops the pressure of the pressurized fluid to allow any droplets of petroleum oil to drop out of the reduced pressurized fluid, while the gaseous fluid is released to the atmosphere.

Figure 16:
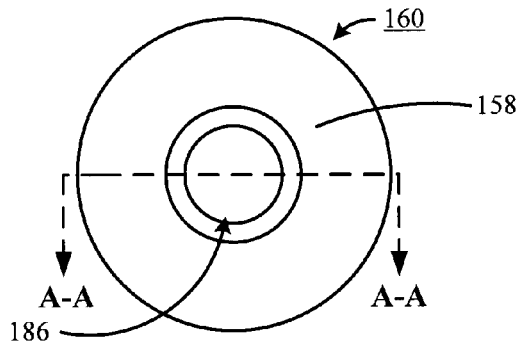
FIG. 16 is a top plan view of a bearing of the alternative rotary union assembly of the present novel tire inflation system of FIG. 15.
Figure 18:
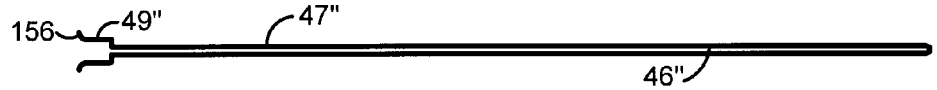
FIG. 18 is a cross-sectional side view of a fluid conduit of the alternative rotary union assembly of the present novel tire inflation system of FIG. 15.
Figure 19:
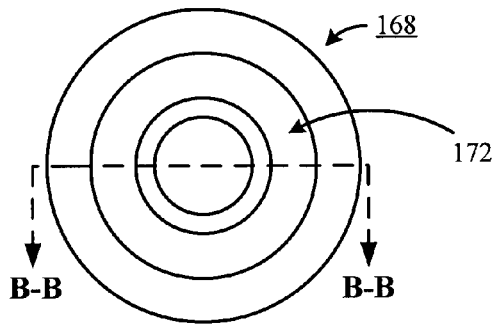
FIG. 19 is a top plan view of a lip seal of the alternative rotary union assembly of the present novel tire inflation system of FIG. 15.
Figure 20:
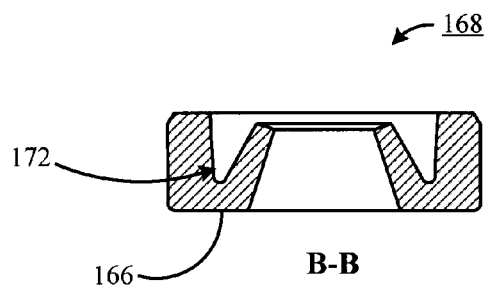
FIG. 20 is a cross-sectional side elevation view of the lip seal of the alternative rotary union assembly of the present novel tire inflation system of FIG. 19.
Figure 21:
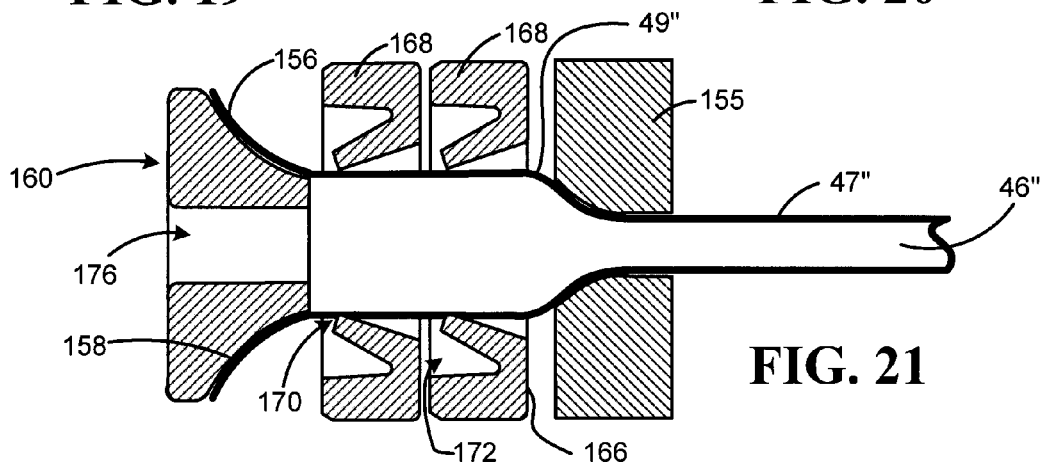
FIG. 21 is a cross-sectional side elevation view of the rotary union of the present novel tire inflation system of FIG. 15.

FIGS. 16 and 17 provide a more detailed view of the bearing 160 showing the shaped surface 158 and bearing fluid channel 186. FIG. 18 provides a more detailed view of the fluid conduit 47". FIGS. 19 and 20 provide a more detailed view of the lip seal 168, while FIG. 21 provides greater detail of the rotary union of the present alternative rotary union assembly embodiment, and a more clear presentation of the relationship between the components thereof. FIG. 21 shows the preferred embodiment of the rotary union of the present alternative rotary union assembly embodiment includes a pair of lip seals 168 mounted to the fluid conduit 47". Preferably, the lip seal 168 adjacent the bearing 160 provides the initial dynamic seal 170, however over time the entail lip seal wears as the hubcap 54 (of FIG. 15) rotates with the lip seal 168 adjacent the bearing 160 about the fluid conduit 47'. Preferably, upon failure of the lip seal 168 adjacent the bearing 160, the lip seal 168 adjacent the bushing 155 forms a dynamic seal with the fluid conduit 47". In addition to providing a smooth, self-lubricating and wear resistant surface between a bottom surface 166 of a lip seal 168, and a bottom portion of the rotary union pocket 154 (see FIG. 15), the bushing 155 serves to protect the integrity of the lip seals 168 when the rotary union assembly 152 of the present alternative embodiment of the present inventive tire inflation system is removed from the spindle 18 and the wheel hub 68 (see FIG. 15).

Figure 22:
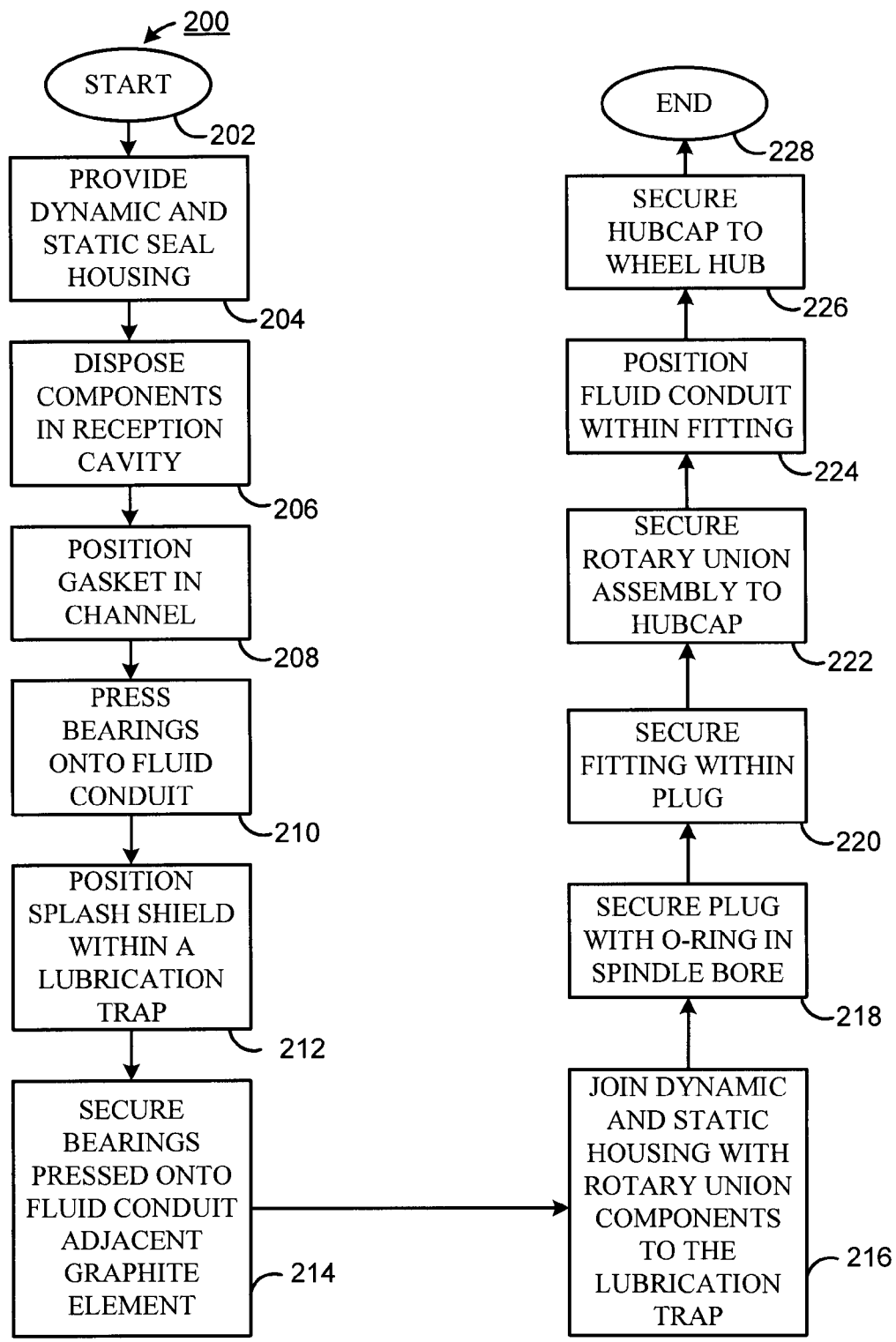
FIG. 22 is a flow chart of a method of assembling the alternate rotary union assembly of the present novel tire inflation system to its associated axle spindle.

FIG. 22 shows a preferred method 200 of assembling the alternate embodiment of the rotary union assembly of the present inventive tire inflation system commencing at start step 202, and continuing at process step 204. At process step 204, dynamic and static seal housing (such as 53) is provided, which preferably includes a pressure relief channel (such as 112) controlled by a pop-it valve (such as 114); a pressurized air passage channel (such as 134) in fluid communication with the relief channel; a spring and graphite element reception cavity (such as 130) configured to accept and support spring (such as 80), washer (such as 78), graphite element (such as 72), and o-ring (such as 79); and a gasket retention channel (such as 132).

At process step 206, the spring, washer, and graphite element components are deposited within the spring and graphite element reception cavity. At process step 208, a gasket member (such as 140) is positioned within the gasket retention channel, and at process step 210, a pair of bearings (such as 56), are pressed onto a fluid conduit (such as 47'). At process step 212, a splash shield (such as 122) is positioned in a lubricant trap (such as 51). At process step 214, the pair of bearings pressed on the fluid conduit is installed within a dynamic and static seal housing adjacent the graphite element.

Continuing with process step 216, the lubrication trap with the pair of bearings, fluid conduit, and splash shield installed therein is joined to the dynamic and static seal housing containing the spring, washer, graphite element, o-ring and gasket member to form a rotary union housing (such as 50') and a rotary union (such as 70). At process step 218, a cylindrical plug (such as 26) provided with an o-ring (such as 27) is secured within a bore (such as 24), of a spindle (such as 18). At process step 220, a fitting (such as 30) providing a pair of seals (such as 34 and 36), and a fluid filter (such as 37), is secured to the cylindrical plug. At process step 222, the rotary union housing containing the rotary union is secured to a hubcap (such as 54). At process step 224, the fluid conduit is disposed within the fitting to align the hubcap with a wheel hub (such as 68). At process step 226, the hubcap is secured to the wheel hub with fasteners (such as 69), and the process concludes at end process step 228.

Figure 23:
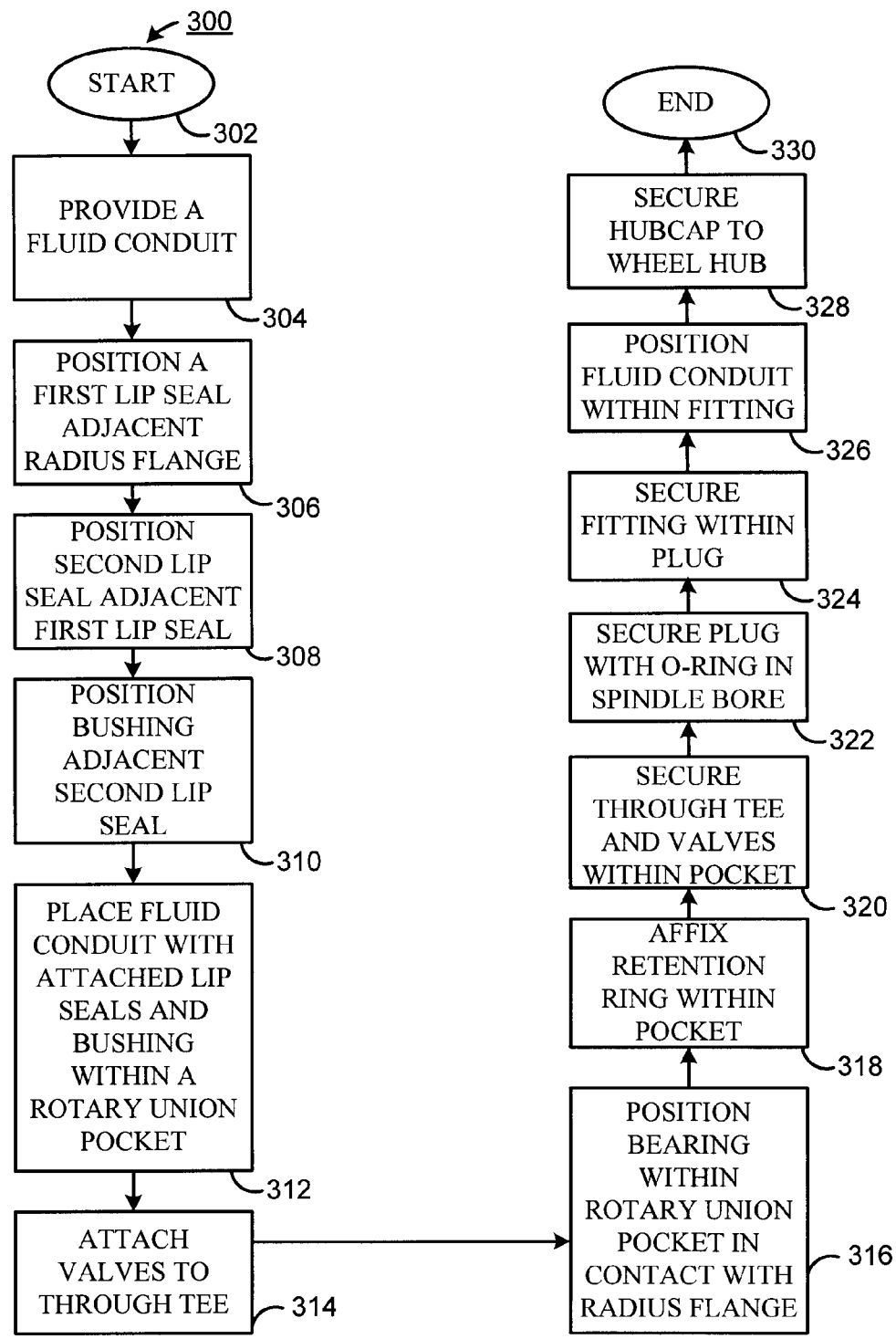
FIG. 23 is a flow chart of a method of assembling the alternative rotary union assembly of the present novel tire inflation system to its associated axle spindle.

FIG. 23 shows a preferred method 300 of assembling the alternative embodiment of the rotary union assembly of the present inventive tire inflation system commencing at start process step 302, and continuing at process step 304. At process step 304, a fluid conduit (such as 47") is provided, which preferably includes a fluid channel (such as 46"), an expanded downstream end portion (such as 49"), and a radius flange (such as 156).

At process step 306, a first lip seal (such as 168) is slid into position adjacent the expanded downstream portion and the radius flange. At process step 308, a second seal (such as 169) is slid into position adjacent the first lip seal. At process step 310, a bushing (such as 155) is positioned adjacent the second lip seal, and at process step 312, the fluid conduit with the lip seals and bushing assembled thereon is placed within a rotary union pocket (such as 154) that is formed by depressing an exterior surface (such as 52) of a hubcap (such as 54). At process step 314, first and second valves (such as 100 and 102) are secured within a through tee (such as 164). At process step 316, a bearing (such as 160) is placed within the rotary union pocket in contact with the radius flange, and at process step 318, retention ring (such as 174) is affixed within the rotary union pocket to inhibit an inadvertent removal of the bearing from the rotary union pocket. At process step 320, the through tee with secured valves is secured within the rotary union pocket adjacent the retention ring, which in a preferred embodiment is an o-ring.

Continuing with process step 322, a cylindrical plug (such as 26) provided with an o-ring (such as 27) is secured within a bore (such as 24), of a spindle (such as 18). At process step 324, a fitting (such as 30) providing a pair of seals (such as 34 and 36), and a fluid filter (such as 37), is secured to the cylindrical plug. At process step 326, the fluid conduit is disposed within the fitting to align the hubcap with a wheel hub (such as 68). At Process step 328 the hubcap is secured to the wheel hub with fasteners (such as 69), and the process concludes at end process step 330.

As will be apparent to those skilled in the art, a number of modifications could be made to the preferred embodiments which would not depart from the spirit or the scope of the present invention. While the presently preferred embodiments have been described for purposes of this disclosure, numerous changes and modifications will be apparent to those skilled in the art. Insofar as these changes and modifications are within the purview of the appended claims, they are to be considered as part of the present invention.

What is claimed is:

1. A tire inflation system comprising:
   an axle enclosing a pressurized fluid and supporting a wheel;
   a tire mounted to the wheel, the tire providing an external surface;
   a hub cap secured to the wheel, the hub cap providing an internal surface and an external surface, the external surface of the hub cap adjacent the external surface of the tire, said external surfaces of the hub cap and the tire are each environmentally unprotected;
   a conduit disposed internal to each the axle and the hub cap, the conduit transfers the pressurized fluid the axle to the tire adjacent the hub cap; and
   a seal formed in a housing at an interface of a rotating surface with a non-rotating surface, the rotating surface rotates relative to the conduit, the housing is attached to the exterior of the hub cap from the exterior of the hub cap, the housing rotates environmentally unprotected with the hub cap relative to the axle, and wherein the conduit remains non-rotating while the rotating surface rotates with the housing when the hub cap rotates relative to the axle and the non-rotating conduit.

2. The tire inflation system of claim 1, in which the housing confining a rotary union including at least a rotating portion for rotation with the hubcap and the non-rotating conduit extending from the axle to the rotating portion.

3. The tire inflation system of claim 2, in which the seal confining a dynamic seal formed between the non-rotating conduit and the rotating portion.

4. The tire inflation system of claim 3, in which the dynamic seal is formed by a lip seal communicating with at least the non-rotating conduit when the non-rotating conduit provides pressurized fluid to the lip seal.

5. The tire inflation system of claim 4, further comprising a through tee secured to the hubcap from the exterior of the hubcap and confining the rotary union a predetermined distance from the axle, and wherein said hubcap is secured to a hub supported by said axle using a self centering fastener.

6. The tire inflation system of claim 5, further comprising a bearing disposed between the non-rotating conduit and the through tee, the bearing promoting rotation of the through tee with the hubcap relative to the fluid conduit.

7. The tire inflation system of claim 6, in which the axle comprises an elongated member with a hollow core providing an interior surface, and further comprising an axle plug secured to the interior surface, the axle plug supporting a first seal member that forms a first pressure seal between the interior surface of the hollow core and the axle plug.

8. The tire inflation system of claim 7, in which the axle plug comprises a fluid conduit support mounting aperture in axial alignment with axle axis.

9. The tire inflation system of claim 8, further comprises a fluid conduit support member secured within the fluid conduit support mounting aperture, in which the fluid conduit support member is in axial alignment with axle axis.

10. The tire inflation system of claim 9, in which the fluid conduit support member comprises a fluid conduit access port, the non-rotating conduit passing through the fluid conduit access port to communicate with the pressurized fluid housed by the axle.

11. The tire inflation system of claim 10, further includes at least a second seal member disposed between the conduit access port and the non-rotating conduit and forming a second pressure seal between the conduit access port and the non-rotating conduit, the second seal member accommodating movement of the non-rotating conduit along the axis of the axle, the second seal member further mitigating rotation of the non-rotating conduit when the through tee rotates with the hubcap.

12. The tire inflation system of claim 3, in which the dynamic seal is a face seal formed by a face of a rigid seal member in pressing contact with a face of the non-rotating conduit.

13. The tire inflation system of claim 12, in which said housing is a rotary union housing supported by the hubcap, the rotary union housing confining the rotary union a predetermined distance from the axle.

14. The tire inflation system of claim 13, further comprising a bearing disposed between the non-rotating conduit and the rotary union housing, the bearing promoting rotation of the rotary union housing with the hubcap relative to the fluid conduit.

15. The tire inflation system of claim 14, in which the axle comprises an elongated member with a hollow core providing an interior surface, and further comprising an axle plug secured to the interior surface, the axle plug supporting a first seal member that forms a first pressure seal between the interior surface of the hollow core and the axle plug.

16. The tire inflation system of claim 15, in which the axle plug comprises a fluid conduit support mounting aperture in axial alignment with the axle axis.

17. The tire inflation system of claim 16, further a fluid conduit support member secured within the fluid conduit support mounting aperture, in which the fluid conduit support member is in axial alignment with the axle axis.

18. The tire inflation system of claim 17, in which the fluid conduit support member comprises a fluid conduit access port, the non-rotating conduit passing through the fluid conduit access port to communicate with the pressurized fluid housed by the axle.

19. The tire inflation system of claim 18, further comprises a second seal member disposed between the conduit access port and the non-rotating conduit and forming a second pressure seal between the conduit access port and the fluid conduit, the second seal member accommodating movement of the non-rotating conduit along the axis of the axle, the second seal member further inhibiting rotation of the non-rotating conduit when the through tee rotates with the hubcap.

20. The tire inflation system of claim 19, further comprises a lubrication trap disposed between the rotary union housing and the hubcap and secured to the hubcap.

21. The tire inflation system of claim 20, in which the lubrication trap comprises a pressure relief pathway adjacent the fluid conduit, the pressure relief pathway mitigating migration of a lubricant from the interior of the hubcap to the exterior of the hubcap while conducting pressurized fluid from interior of the hubcap to the exterior of the hubcap when the pressurized fluid within the interior of the hubcap attains a predetermined pressure level.

* * * * *

UNITED STATES PATENT AND TRADEMARK OFFICE
CERTIFICATE OF CORRECTION

PATENT NO. : 8,028,732 B1
APPLICATION NO. : 12/146287
DATED : October 4, 2011
INVENTOR(S) : Anthony L. Ingram et al.

It is certified that error appears in the above-identified patent and that said Letters Patent is hereby corrected as shown below:

IN THE CLAIMS:

Column 13, Lines 9-30 should read:

1. A tire inflation system comprising:
    an axle enclosing a pressurized fluid and supporting a wheel;
    a tire mounted to the wheel, the tire providing an external surface;
    a hub cap secured to the wheel, the hub cap providing an internal surface and an external surface, the external surface of the hub cap adjacent the external surface of the tire, said external surfaces of the hub cap and the tire are each environmentally unprotected;
    a conduit disposed internal to each the axle and the hub cap, the conduit transfers the pressurized fluid from the axle to the tire adjacent the hub cap; and
    a seal formed in a housing at an interface of a rotating surface with a non-rotating surface, the rotating surface rotates relative to the conduit, the housing is attached to the exterior of the hub cap from the exterior of the hub cap, the housing rotates environmentally unprotected with the hub cap relative to the axle, and
    wherein the conduit remains non-rotating while the rotating surface rotates with the housing when the hub cap rotates relative to the axle and the non-rotating conduit.

Column 13, Lines 31-34 should read:

2. The tire inflation system of claim 1, in which the housing confines a rotary union, said rotary union includes at least a rotating portion and the non-rotating conduit, wherein the non-rotating conduit extends from the axle to the rotating portion, and wherein said rotating portion rotates with said hub cap.

Signed and Sealed this
Fifteenth Day of May, 2012

David J. Kappos
*Director of the United States Patent and Trademark Office*

CERTIFICATE OF CORRECTION (continued)

U.S. Pat. No. 8,028,732 B1

IN THE CLAIMS:

Column 14, Lines 35-38 should read:

17. The tire inflation system of claim 16, further comprising a fluid conduit support member secured within the fluid conduit support mounting aperture, in which the fluid conduit support member is in axial alignment with the axle axis.